United States Patent [19]

Michaud et al.

[11] Patent Number: 5,731,951
[45] Date of Patent: Mar. 24, 1998

[54] DISK DRIVE ADD-ON DEVICE HAVING DISK DRIVE WITH AIR PASSAGES AND SUPPORT WITH AIR PASSAGES

[75] Inventors: Gilbert Michaud, Maule; Daniel Carteau, Le Bretonneux; Laurent Gargemel, Avrille, all of France

[73] Assignee: Bull S.A., Paris, France

[21] Appl. No.: 711,473

[22] Filed: Sep. 6, 1996

[30] Foreign Application Priority Data

Sep. 8, 1995 [FR] France ................... 95 10555

[51] Int. Cl.⁶ .................. G06F 1/16; G06F 1/20; H05K 7/20
[52] U.S. Cl. ...................... 361/685; 361/687
[58] Field of Search ............ 364/708.1; 369/75.1; 360/97.01; 361/685, 687

[56] References Cited

U.S. PATENT DOCUMENTS 5,333,098  7/1994  Deluca et al. ............... 361/685
5,375,113  12/1994  Pollard et al. .
5,506,750  4/1996  Carteau et al. ............... 361/685

FOREIGN PATENT DOCUMENTS 0621600  10/1994  European Pat. Off. .

*Primary Examiner*—Michael W. Phillips
*Attorney, Agent, or Firm*—KerKam, Stowell, Kondracki & Clarke, P.C.; Edward J. Kondracki

[57] ABSTRACT

An add-on device (DHD) for disk drives (D) for a multidisk system containing a plurality of drawers (T) includes a metal base support (S) for a disk drive (D), an opening (O) into which an external connector (CN) of the device is inserted, a mechanism for inserting, extracting and locking (PO, R, R1-R2) the device in a selected slot of the drawer, air passages for ventilating the disk drive, a first printed circuit board (CCE) for interconnecting the disk drive with its external environment, and a second board (CCT) connected to the first printed circuit board for supporting DC voltage conversion functions.

5 Claims, 4 Drawing Sheets

DISK DRIVE ADD-ON DEVICE HAVING DISK DRIVE WITH AIR PASSAGES AND SUPPORT WITH AIR PASSAGES

BACKGROUND OF THE INVENTION

The present invention relates to a disk drive add-on device for a multidisk subsystem. It is more particularly applicable to the physical structure of a sub-system comprising a plurality of removable disk drives disposed in a plurality of parallel plates, all of which are disposed in a compartment in the form of a drawer, which drawer can itself be placed in a cabinet which can contain several such drawers.

1. Field of the Invention

It is known that modern high-end computing systems process increasingly larger volumes of data, which necessitates the utilization of an ever larger number of the mass storage devices in which they must be stored before being processed by the central processors of these systems.

Since the management of such systems as a whole by a single central processor is too cumbersome, this has led to a decentralization of the activity of this processor at the level of several subsystems, each of which manages some of the elements of the system, particularly the disk storage devices.

This creates mass storage subsystems comprising, for example, a plurality of disk drives which, in place of the central processor, manage the transfer of data from this processor to these drives, as well as the writing and reading of the information in them.

2. Description of Related Art

The physical structure of such a subsystem is described, for example, in French patent No. 2 704 350, owned by the Applicant and corresponding to U.S. Pat. No. 5,506,750, the subject matter of which is hereby incorporated herein by reference. Its essential elements, which are necessary to an understanding of the invention, are summarized in FIGS. 1 and 2.

As shown in FIG. 1, the physical structure named SP comprises a drawer T in the shape of a parallelepiped comprising, on each of its internal lateral walls, a plurality of pairs of longitudinal slides which are parallel to one another and disposed one above the other, namely G1–G'1, G2–G'2, . . . , G7–G'7.

The structure SP also comprises a plurality of plates P1, P2, . . . , P7 which are parallel to one another, are relatively flat, have a rectangular parallelepipedic shape, and are disposed in the same longitudinal direction as the drawer T. They can each slide into drawer T on the slides G1–G'1 through G7–G'7, respectively, from front to back or from back to front, longitudinally, in the direction of the arrow f1, parallel to the length of the drawer T.

The plates P1 through P7 are inserted through the front part of the drawer T, namely TAV, while the rear part PAR is composed of two identical power supplies AL1 and AL2, each of which is equipped with a ventilation device V1, V2 respectively, disposed side by side.

Each of the plates P1 through P5 includes several disk drives which number 10 in FIG. 1. The plate P6, for example, carries the central processor which manages the entire peripheral subsystem including the disk drives of the plates P1 through P5. The plate P7 carries a set of backup batteries BAT.

The front part PAV and the rear part PAR are separated by a backpanel FP which has a certain number of electrical connections.

FIG. 2 shows a front view of an example of embodiment of one of the plates P1 through P5, namely P1. P1 comprises two parallel rows of five disk storage devices (SD101 to SD110) called "disk drives," or more simply "disks," disposed side by side, namely a first row of disks 101 through 105 and a second row of disks 106 through 110, respectively. The longitudinal axes of these disks are perpendicular to the longitudinal axis of P1.

The plate P1 comprises a central part which carries a printed circuit board CDA1 which carries an adapter device. The two rows 101 through 105 and 106 through 110 are disposed on either side of this central part CDA1. The disks in the first row are all connected to the same side of the board CDA1. Likewise, the disks in the second row are connected to CDA1 on the same side, opposite the side to which the disks in the first row are connected.

On the longitudinal edges of P1, there is a series of board pullers which make it possible to insert or extract the disks from the row with which they are associated, and to lock them into place on P1, thus facilitating the connection of the disks to CDA1. The board pullers EX101 through EX105 may be seen on the right hand side of FIG. 2 from the bottom to the top of the figure.

The latter are associated with the disks 101 through 105, respectively, whereas other board pullers are associated with the disks 106 through 110, respectively. As shown in FIG. 2, at the center of the plate, on its front and rear edges respectively, there are a series of rectangular shaped ventilation holes TVA and TVR which allow the passage of ventilating air V in the direction indicated by the arrows parallel to the length of the plate P1. The ventilating air V aspirated by the ventilators V1 and V2 flows from front to back in the direction of the length of the plates. It passes above and below the disks 101 through 105, and 106 through 110.

SUMMARY OF THE INVENTION

The present invention relates to a disk drive add-on device for adding disk drives such as 101 through 110, which can be easily manipulated by the user of the multidisk subsystem which contains it or by maintenance personnel, and which can be inserted into or extracted from the drawer T, at a minimum cost and with maximum reliability.

This add-on device supports a standardized three-and-a-half inch disk drive, a connector of the SCSI type (SCSI type connections between disks being standardized), a device for handling the ventilation of the drawer, and is supplied with power by a single supply, in this case +24 V. It includes visual indicators which give the user information about its operation, and it ensures the mechanical and electronic protection of all of its electronic components.

According to the invention, the disk drive add-on device for a multidisk subsystem containing a plurality of drawers, each having several slots for disk drives, which includes:

a metal support having means for mounting the drive;

an opening into which the external connector of the device is inserted;

inserting, extracting and locking means which make it possible to insert or extract this device into or from the selected slot in the drawer, is characterized in that, with the support including means for handling its ventilation, it comprises:

a first printed circuit board for interconnection between the disk drive and its external environment by means of the external connector, a second board which supports the DC voltage conversion functions and is connected to the first.

BRIEF DESCRIPTION OF THE DRAWINGS

Other characteristics and advantages of the present invention will emerge from the following description, given as a non-limiting example and in reference to the appended drawings. In these drawings.

DESCRIPTION OF THE PREFERRED EMBODIMENT

Figure 3:
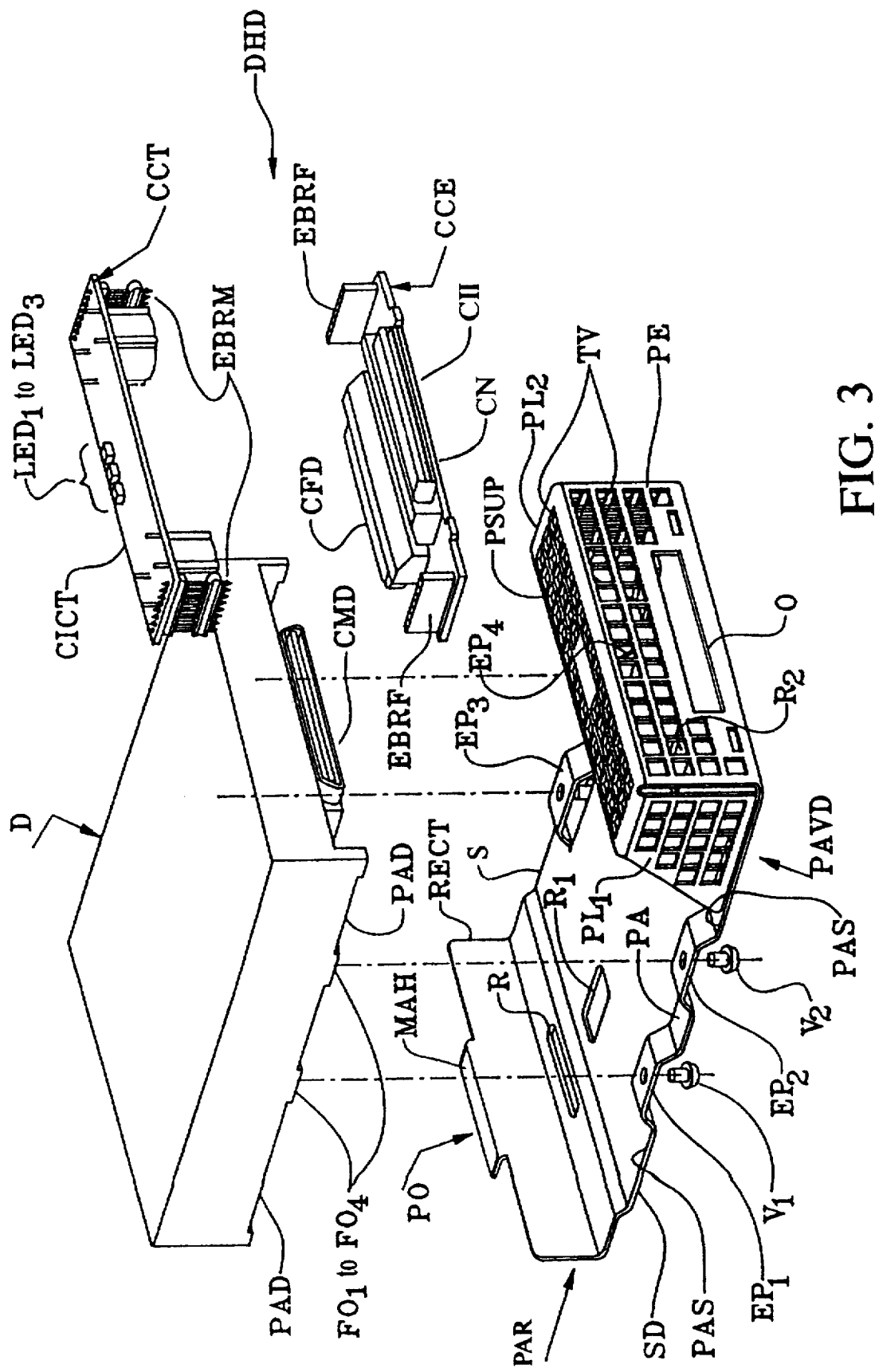
FIG. 3 is an exploded three-quarter view in perspective showing a disk drive and the corresponding add-on device according to the invention.

FIG. 3 shows, on the one hand, a disk drive D having a substantially parallelepipedic shape with its male connector CMD disposed in the lower part of one end, typically its right end as shown in this figure, and on the other hand its add-on device DHD. For purposes of simplification, in the rest of the text, the disk drive D will be designated as "disk D."

A) General Structure of the Add-On Device

Figure 1:
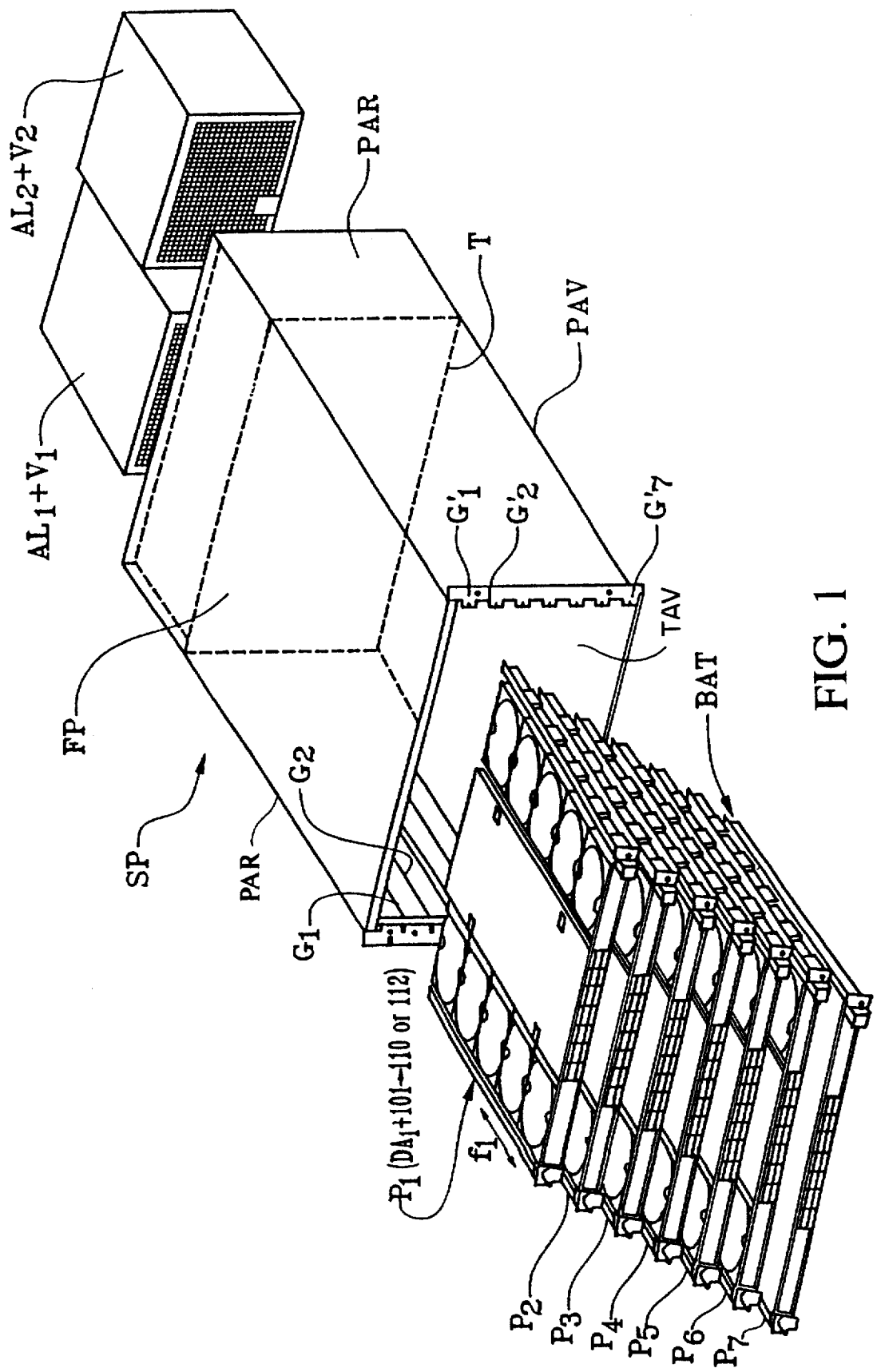
FIG. 1 illustrates the physical structure of a peripheral mass storage subsystem, the scope of which includes the invention.

The various essential elements constituting the add-on device DHD, which number six, are the following:

a) The metal support SD for the disk D, b) The opening O into which the external connector of the disk D, namely CN, is inserted, c) The inserting, extracting and locking means which make it possible to place (or remove) DHD in (or from) the selected slot of the drawer T (also referred to in FIG. 1), constituted by the gripping handle PO and the groove R, as well as the notches R1 and R2, d) The means for handling the ventilation of the disk D, e) A first board CCE for interconnecting D with its external environment (for example an adapter board like CDA$_1$ in FIG. 2) by means of the connector CN, f) A second board CCT for DC voltage conversion connected to the first.

The first and second boards are disposed at the front end or part of the device DHD which contains the opening O and the connector CN.

B) Detailed Description of the Various Elements a) The support SD:

The support SD comprises a base S with a substantially rectangular shape, a rear part PAR, disposed on its left end in FIG. 3, which is essentially constituted by the gripping handle PO which makes it possible to handle the assembly formed by the disk D and DHD manually and with ease when it is necessary to insert (or remove) this assembly into (from) the drawer T, and a front part PAVD which is hollow toward the inside of base S and has a substantially parallelepipedic shape, disposed on its right end in FIG. 3.

b) The opening O:

The front part PAVD of DHD has a bottom part constituted by the front part of the base S, two lateral walls PL1 and PL2 (the lateral edge of each wall disposed toward the inside of S is inclined relative to this base, while the other edge disposed at the front toward the outside is perpendicular to it), with a rectangular trapezoidal shape, perpendicular to base S and parallel to its length, a top part PSUP parallel to its bottom part, and its most external part PE which contains the opening O, perpendicular to the base and parallel to its width. As seen in FIG. 3, O has a rectangular shape with a large dimension parallel to the width of base S and is disposed in the lower part of PAVD in immediate proximity to base S.

c) The gripping and locking means:

The disk D is equipped with four feet FO1 through FO4 disposed on its bottom part, only two of which are visible in FIG. 3. The base S includes in its central part four shoulders EP$_1$ through EP$_4$ disposed on each of its two longitudinal edges (naturally with two shoulders on each of them). Each shoulder EP1 through EP4 is associated, respectively, with a foot FO1 through FO4 of the disk D. It includes at its center a hole through which a screw V1 through V4 can be passed in order to be inserted into the corresponding foot, which allows D to be attached to base S, thus constituting a single mechanical assembly (D+DHD).

The gripping handle (PO) of this assembly is formed by a rectangular wall RECT perpendicular to base S and a plate which is perpendicular to this wall and thus parallel to base S but which has a length shorter than the width of base S, which plate is intended to be grasped by the ends of the fingers of anyone seeking to handle the assembly (D+DHD).

Figure 2:
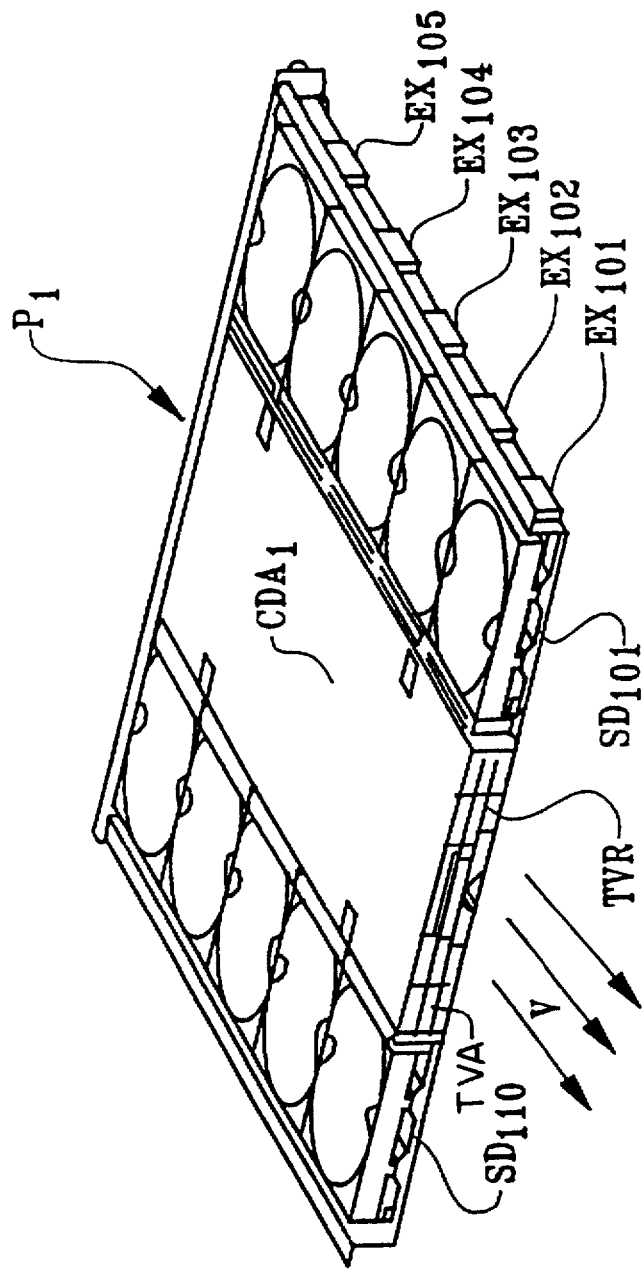
FIG. 2 illustrates the physical constitution of a drawer of such a structure, into which the disk drive according to the invention is inserted.

The groove R, the longitudinal axis of which is perpendicular to the length of base S and which is disposed toward the rear of it, in proximity to the wall RECT, is intended to cooperate with board pullers such as EX101 and EX105 in FIG. 2, in a way that is analogous to that indicated in the above-mentioned patent application.

The two notches R1 and R2 have a rectangular shape, and their longitudinal axis is the same as that of base S. They are disposed toward the rear and toward the front of base S, respectively, though R2 is masked in FIG. 2 by the ventilation holes. These notches are intended to cooperate with hooks belonging to the base of the drawer T, which pass through them as soon as DHD is inserted into the drawer because of the cooperation between the board puller and R (see above). These hooks then hold the assembly (D+DHD) firmly inside the drawer T.

d) The means for handling the ventilation:

These means are formed by the association of the ventilation spaces PAS and PAD, on the one hand, and by the ventilation holes TV on the other hand, which are defined below.

As seen in FIG. 3, once D is mounted on base S, there are, between the surface of base S and the bottom surface of the disk D, spaces PA disposed on either side of the feet FO1 through FO4 and the shoulders EP$_1$ through EP$_4$, which can allow ventilating air to pass under D, transverse to it (see also FIG. 2). These spaces can be broken down into spaces PAD located underneath the disk itself, which may be said to belong to it, and spaces PAS located above base S, which may be said to belong to base S.

The means TV are formed of rows of rectangular holes which are parallel to one another, cut into each of the walls PL1 and PL2, PE and PSUP.

In this way, efficient ventilation of the disk D is ensured inside the drawer T, thus in fact providing a longer service life for the drawer.

The front part PAVD thus constitutes a sort of open-work container inside which the two boards CCE and CCT are housed, with the connector CN passing through the opening O.

e) The first board for interconnection:

The first board for interconnection CCE includes the printed interconnection circuit CII, the external connector CN, the female connector CFD, and the set of female pins EBRF.

The circuit CICT serves as a mechanical base plate for the board CCE and has a quasi-rectangular shape. The connectors CN and CFD are mounted on the latter on its large front side (the furthest to the right in FIG. 3) and on its large rear side (the furthest to the left in FIG. 3), respectively. It may be said in a way that CN and CFD are disposed back to back (but are not in fact in mechanical contact with one another).

CN and CFD are each electrically connected to the circuit CII.

The set of pins EBRF is formed of identical rectangular shaped half-sets of eight female pins, each of which is disposed along the small sides of CII, thus surrounding the two connectors CN and CFD.

The connector CN is the standardized 80-pin type female connector, while the connector CFD (as well as its male counterpart CMD) is the type known as SCA, which is also standardized.

f) The second board for voltage conversion:

The second board for voltage conversion CCT includes the printed voltage conversion circuit CICT, the set of male pins EBRM, and a set of three light-emitting diodes of the LED type, namely the three diodes LED1 through LED 3. The first indicates whether the disk is supplied with power, the second indicates whether the disk is running, and the third indicates whether there is a failure in the operation of the disk D.

The circuit CICT serves as a mechanical base plate for the board CCT and has a quasi-rectangular shape. It carries in its upper part (at the top of FIG. 3) the three diodes LED1 through LED 3.

The set of pins EBRM is formed of identical rectangular shaped half-sets of eight male pins, each of which is disposed along the small sides of CICT. They are therefore disposed on CICT in the same way as the two half-sets EBRF are disposed on CII. It is obvious that the male pins of EBRM are intended to be inserted into the corresponding female pins of EBRF.

C) Embodiment of the Mechanical Assembly (D+DHD)

In order to embody the mechanical assembly (D+DHD), CCT is fitted into CCE by pressure inserting the set of male pins EBRM into the set of female pins EBRF. The subassembly thus constituted is then connected by means of CFD to CMD and consequently to D. The subassembly (CCE+CCT+D) is then fitted into S, with the two boards (CCT+CCE) being inserted into the front part PAV. Then D is screwed onto S by the four screws V1 through V4.

D) Electrical Functionalities of the Boards CCT and CCE

Figure 4:
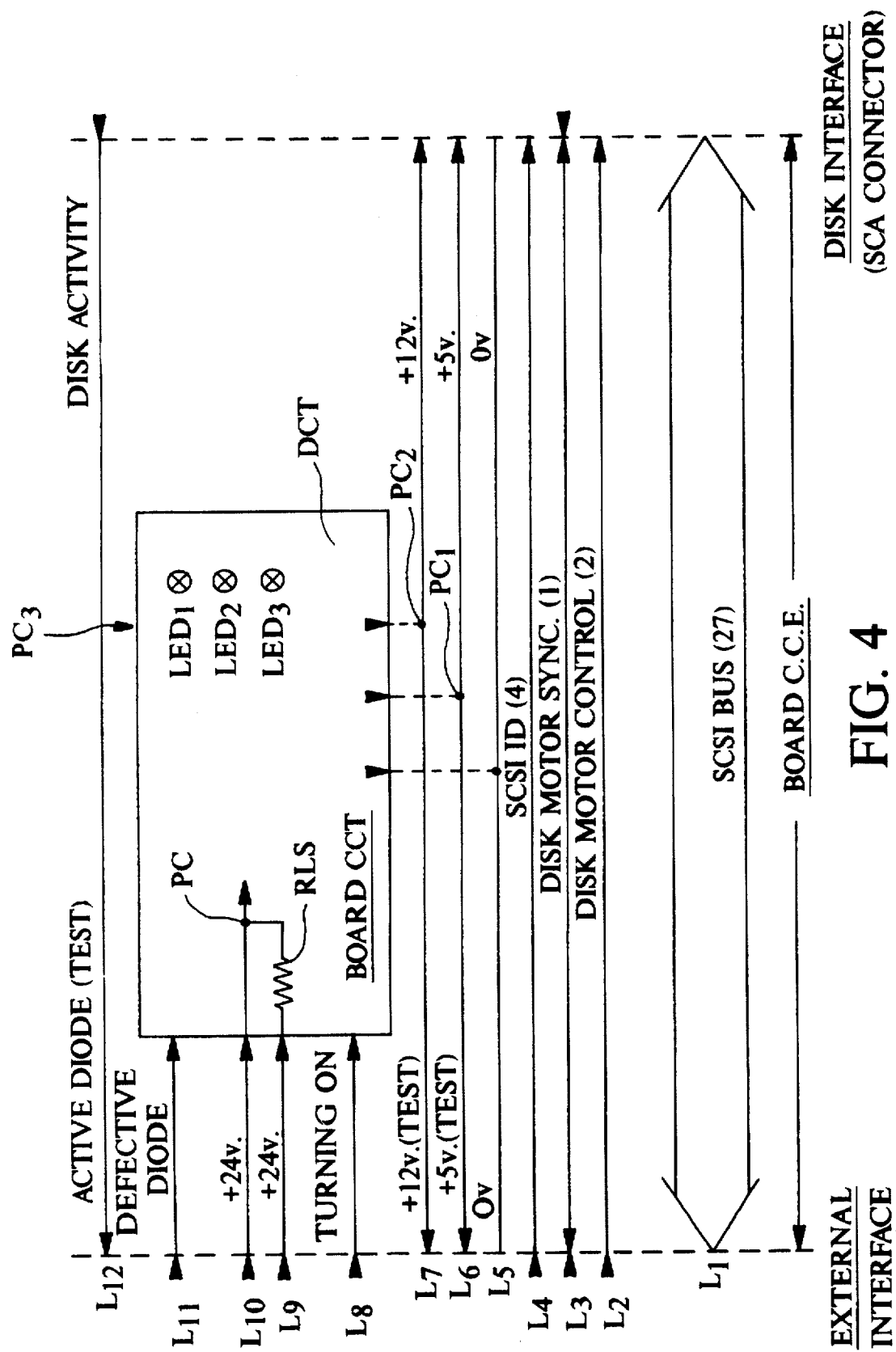
FIG. 4 shows, in simplified form, the functional diagram of the two printed circuit boards of the add-on device according to the invention.

The principal electrical functionalities of the boards CCE and CCT are illustrated by FIG. 4, with those of the former being at the bottom of the figure, and those of latter being at the top. The broken vertical line located on the left side of FIG. 4 symbolizes the external interface of the assembly (D+DHD), which is physically represented by the connector CN, while that on the right side symbolizes the disk interface, which is physically represented by the connector CMD.

All of the horizontal lines in FIG. 4 symbolize electrical links embodied on each of the two boards, and their significance is indicated above these lines. From the bottom to the top of FIG. 4, twelve links L1 through L12 are included. When these links comprise several electric conductors, this is indicated by a number in parentheses. It is clear that these links are the ones that are physically embodied on each of the printed circuits CII and CICT.

The board CCE includes the lines L1 through L4, the board CCT includes the lines L6 through L12, and the line L5 common to both boards is the ground (potential 0V).

Note lines L1 through L4 of CCE.

The line L1 is formed by 27 conductors of the standardized SCSI bus of the type known as "Fast/Wide single-ended SCSI".

The line L2 composed of two conductors is the one intended to control the motor which drives the magnetic disks of the disk drive D.

The line L3 is monofil and is intended to synchronize this motor.

The line L4 composed of four conductors is that of the four identification conductors ID for the standardized SCSI bus. Thus it is clear that, in CCE, this bus is in fact constituted by the lines L1 and L4.

Mote the lines L6 through L12 of CCT, it being understood that the board CCE comprises a DC voltage conversion device, namely DCT. This device receives through the external interface (connector CN) and the monofil lines L9 and L10 a DC voltage of +24 V. It will be noted that the line L9 is connected to L10 by means of the resistor RLS which makes it possible to limit voltage surges when the boards CCE, CCT and the disk D are turned on. The common point between L9 and L10 is disposed on the board CCT.

The device DCT transforms the DC input voltage of +24 V into two direct current voltages of +5 V and +12 V, which are used in the standardized way in disks such as D.

The device DCT is connected to two monofil lines L6 and L7 by means of the connection points PC1 and PC2, and because of this it is connected to the two connectors CFD and CMD and consequently to the disk D. It must be noted that the part of the lines L6 and L7 between PC1 and PC2, on the one hand, and the connector CN on the other hand, is only used during tests of D in which the conversion device is operating, and in which the object is to verify whether the DC supply voltages of D are in fact equal to +5 V or +12 V.

The monofil line L8 makes it possible to connect the connector CN to the board CCT and to control the turning on of the board CCT, and thus whether or not the board CCT and therefore the disk D are running.

The monofil line L11 is intended to supply the diode LED3.

The monofil line L12, which is intended to supply the diode LED2, is connected to the board CCT by means of the connection point PC3. The part of the line L12 located between PC3 and the connector CN is used to verify during a test whether the diode LED3, as well as the control signal which supplies it, are operating correctly.

It is appropriate to note that, when the disk D is connected to the board CDA1, the connecting pins of the connector CN are disposed in such a way that the ground line L5 is the first to be connected, timewise. In fact, the respective connections of the line L5 and the other lines are spatially offset.

E) Advantages of the Invention

The principal advantages of the add-on device according to the invention are the following:

extreme simplicity and therefore reduced cost, in view of the additional functionalities it provides with regard to a disk like D on the market, great reliability of the assembly due to the fact that there is no cable, and to the presence of ventilation means MPV, a reduction in the distance between the disk D and the SCSI bus (in CDA1), acceptance of all the 3½" type disks on the market, no specific wiring, simple and rapid assembly in manufacturing: just the four screws V1 through V4, connection support in operation: the resistor RLS and the spatial offset of the contacts of CN, the turning on or off of the disk by the line L8, autonomous operation of the assembly: voltage converters integrated into the add-on device, display by LED 1 through LED3 of indications about the operation of the disk D, no interference from one add-on device to the next, the possibility, through CDA 1 (FIG. 2) of verifying the presence or the absence of a disk such as D inside T and also of generating a Reset function (RAZ) for the SCSI bus during the operations for connecting/disconnecting it (in order to protect the integrity of the data), easy adaptation to changes in the interface: it is possible to change from parallel SCSI to serial SCSI easily: only CCE needs to be changed, which limits the development cost of DHD.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit of the invention as set forth herein and defined in the claims to which reference should be made for a full appreciation of the full scope of the invention.

We claim:

1. An add-on device (DHD) for disk drives (D) for a multidisk system having a plurality of drawers (T) each of which has several slots for disk drives, said add-on device comprising:

a metal support (S);

means located on said support (EP1 through EP4, V1 through V4) for mounting a drive (D);

an opening (O) in the metal support adapted to receive an external connector (CN);

inserting, extracting and locking means (PO, R, R1–R2) for inserting and extracting the device into or from a selected slot in the drawer (T);

L a disk drive;

means for ventilating the disk drive;

a first printed circuit board (CCE) adapted for interconnection between the disk drive (D) and an external environment by means of the external connector (CN);

a second board (CCT) connected to the first board and adapted to support DC voltage conversion functions, said two boards being disposed at one end of the add-on device; and wherein the means for ventilating the disk drive comprises:

first air passages (PAS) inside the support transverse to the disk drive;

second air passages (PAD) in the disk drive transverse to the support; and a set of ventilation holes (TV) located at the end of the device which includes the first and the second boards, wherein said set of ventilation holes are in communication with said first air passages and said second air passages.

2. Add-on device according to claim 1, wherein the end of the support which includes the set of ventilation holes forms a parallelepipedic perforated box inside of which are located the first board and the second board (CCE and CCT) which are connected one to another through two sets of pins (EBRF and EBRM) disposed on either side of said boards and perpendicularly thereto.

3. The device according to claim 1, further including display means (LED1 through LED3) for indicating a status of the disk.

4. The device according to claim 1, further comprising two DC voltage converters for transforming a single external input voltage into two voltages corresponding to specifications of the disk drives.

5. The device according to claim 1, wherein the first and second boards include means (L8, CN) for turning the add-on device on and off.

* * * * *

UNITED STATES PATENT AND TRADEMARK OFFICE
CERTIFICATE OF CORRECTION

PATENT NO. : 5,731,951
DATED : Mar. 24, 1998
INVENTOR(S) : MICHAUD et al

It is certified that error appears in the above-indentified patent and that said Letters Patent is hereby corrected as shown below:

Col. 8, Line 4, (Claim 1) "L a disk drive;" should be
-- a disk drive; --.

Signed and Sealed this

Seventh Day of July, 1998

Attest:

BRUCE LEHMAN

Attesting Officer

Commissioner of Patents and Trademarks